(12) United States Patent
Birau et al.

(10) Patent No.: US 8,703,981 B2
(45) Date of Patent: Apr. 22, 2014

(54) LIGNOSULFONATE COMPOUNDS FOR SOLID INK APPLICATIONS

(75) Inventors: Mihaela Maria Birau, Mississauga (CA); C. Geoffrey Allen, Waterdown (CA); Salma Falah Toosi, Mississauga (CA); Biby Esther Abraham, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/565,944

(22) Filed: Aug. 3, 2012

(65) Prior Publication Data
US 2014/0039168 A1 Feb. 6, 2014

(51) Int. Cl.
*C07D 407/14* (2006.01)
*C07D 493/04* (2006.01)

(52) U.S. Cl.
USPC .......................................... 549/464; 549/511

(58) Field of Classification Search
USPC ................................. 549/464, 511
See application file for complete search history.

(56) References Cited

U.S. PATENT DOCUMENTS

| | | | |
|---|---|---|---|
| 4,177,313 A | 12/1979 | Herault | |
| 5,811,385 A | 9/1998 | Eyrisch et al. | |
| 5,880,299 A | 3/1999 | Obiols et al. | |
| 5,972,047 A | 10/1999 | Dilling et al. | |
| 5,989,299 A | 11/1999 | Dilling et al. | |
| 6,309,453 B1 | 10/2001 | Banning et al. | |
| 6,435,277 B1 | 8/2002 | Qu et al. | |
| 6,860,930 B2 | 3/2005 | Wu et al. | |
| 7,407,539 B2 | 8/2008 | Wu et al. | |
| 7,973,186 B1 | 7/2011 | Goredema et al. | |
| 2008/0308004 A1 | 12/2008 | Deroover et al. | |
| 2012/0180694 A1 | 7/2012 | Birau et al. | |

OTHER PUBLICATIONS

U.S. Patent Application filed Aug. 3, 2012, of Mihaela Maria Birau et al., entitled "Phase Change Ink Compositions Containing Lignosulfonate Compounds," 43 pages, U.S. Appl. No. 13/565,920, not yet published.
Yifu et al., "Effect of Quaternary Ammonium Ions on Properties of Water-Reducing Agent of Lignosulfonate," Chemical Research, vol. 11, No. 2, Jun. 2000, pp. 33-36, Abstract in English.

*Primary Examiner* — Kristin Vajda
(74) *Attorney, Agent, or Firm* — Marylou J. Lavoie

(57) ABSTRACT

A lignosulfonate compound for phase change ink of the formula

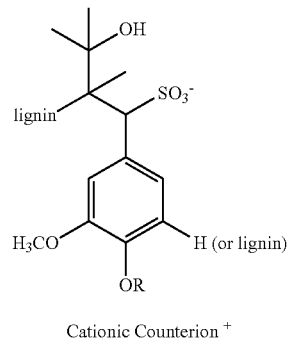

Cationic Counterion + wherein R is hydrogen or

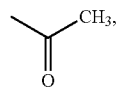

and wherein the cationic counterion+ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

19 Claims, 1 Drawing Sheet

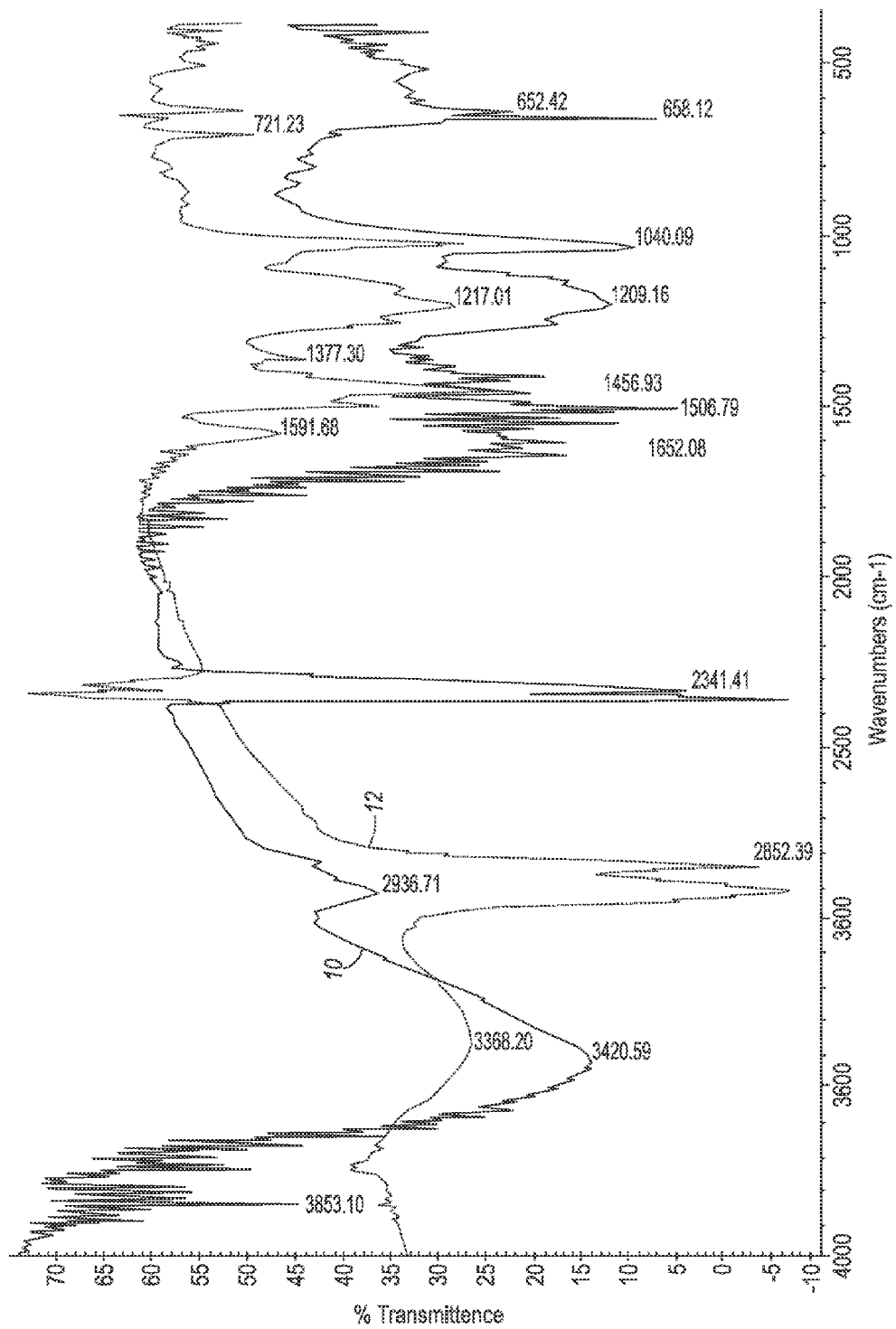

LIGNOSULFONATE COMPOUNDS FOR SOLID INK APPLICATIONS

TECHNICAL FIELD

Described herein are lignosulfonate compounds. More particularly, described herein are modified lignosulfonate compounds suitable for use in solid phase change or hot melt inks that may be used in a number of copying and printing devices.

RELATED APPLICATIONS

Commonly assigned U.S. patent application Ser. No. 13/565,920, entitled "Phase Change Inks Containing Lignosulfonate Compounds", filed concurrently herewith, which is hereby incorporated by reference herein in its entirety, describes phase change inks including a lignosulfonate compound used to improve solid ink face plate drooling and fouling performance.

BACKGROUND

Solid inks containing organic pigments and dyes or a pigment/dispersant package can show poor drooling behavior and unacceptable faceplate staining on the ink jet print head. Attempts to improve drooling performance in solid inks have included changing pigments, changing dispersants, and using various synergists with the pigment to enable dispersion stabilization. Compounds available off the shelf to address this drooling and staining problem have shown an undesirably strong gelling behavior in solid ink. Certain acidic compounds, such as sodium dodecylbenzene sulfonic acid (DDBSA), have been incorporated into pigmented inks but did not improve drool performance.

There remains a need for improved compounds that can be used in solid ink formulations that can provide improved drooling and staining characteristics. There further remains a need for green or bio-renewable additives for pigmented solid ink that can provide improved face plate drooling and staining characteristics.

The appropriate components and process aspects of the each of the U.S. patents and Patent Publications referenced herein may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a lignosulfonate compound for phase change ink of the formula:

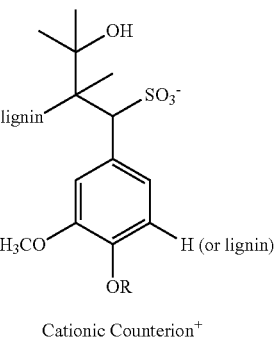

wherein R is hydrogen or

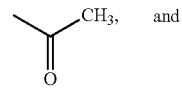

wherein the cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

Also described is a process for preparing a lignosulfonate compound for phase change ink comprising contacting a lignosulfonate metal salt with a nitrogen-alkyl cationic counterion, a nitrogen-aryl cationic counterion, a nitrogen-alkylaryl cationic counterion, or a nitrogen arylalkyl cationic counterion, wherein the cationic counterion contains at least eight carbon atoms, to produce a modified lignosulfonate compound.

BRIEF DESCRIPTION OF THE DRAWINGS

FIG. 1 is a graph illustrating infrared spectra of a sodium lignosulfonate and a modified lignosulfonate in accordance with the present disclosure.

DETAILED DESCRIPTION

A lignosulfonate compound for phase change ink of the formula:

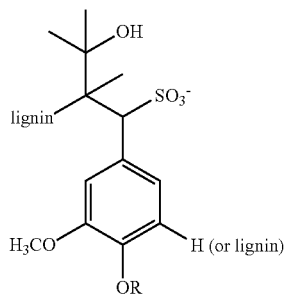

is provided wherein R is hydrogen or

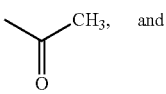 and wherein the cationic counterion⁺ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

In certain embodiments, the lignosulfonate compound cationic counterion includes an alkyl group containing at least eight carbon atoms.

In embodiments, the lignosulfonate compound cationic counterion contains two alkyl chains. In certain embodiments, the lignosulfonate compound cationic counterion contains three alkyl chains.

In embodiments, the lignosulfonate compound cationic counterion can be selected from the group consisting of tetraoctylammonium, tetradodecylammonium, tetraoctadecylammonium, N,N-dimethyl dioctadecyl ammonium, N,N-dimethyl dioctyl ammonium, N,N-dimethyl dodecyl ammonium, N,N,N-trimethyl-1-docosanaminium, behenyl trimethylammonium, N-octadecyltrimethylammonium, mixtures and combinations thereof, and salts thereof. In embodiments, suitable materials for the lignosulfonate cationic counterion are selected from the group consisting of such ARQUAD® materials available from AKZO NOBEL such as Arquad® 316, cocoalkyltrimethylammonium from ARQUAD® C-35, didecydimethylammonium from ARQUAD® 2.10-50, ARQUAD® 2.10-70 HFP, 2.10-80, coco(fractionated) dimethylbenzylammonium from ARQUAD® MCB 33, ARQUAD® MCB 50, ARQUAD® MCB 80, hexadecyltrimethylammonium from ARQUAD® 16-29, stearyltrimethylammonium from ARQUAD® 18-50, behenyltrimethylammonium from ARQUAD® 20-80, mixtures and combinations thereof, and salts thereof.

Examples of suitable alkoxylated quaternary ammonium cationic counterions include Ethoquad® C/12 (cocobis(2-hydroxyethyl)methylammonium chloride) wherein R is coco and m+n=2, Ethoquad® C/25 (cocoalkylmethyl(polyoxyethylene(15))ammonium chloride) where R is coco and m+n=15, Ethoquad® O/12 (oleylbis(2-hydroxyethyl)methylammonium chloride) where R is oleyl and m+n=2 available from Lion Akzo Corporation.

In embodiments, the quaternary ammonium cationic counterion herein can be an oligomer of the formula

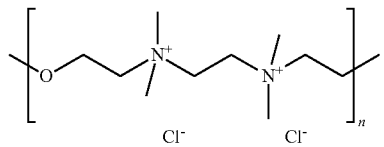

wherein n is at least 1. In a specific embodiment, the quaternary ammonium cationic counterion is poly[oxy-1,2-ethanediyl(dimethyliminio)-1,2-ethanediyl(dimethyliminio)-1,2-ethanediylchloride (1:2)] (Polixetonium chloride) available from Advantis Technologies, Inc.

In other embodiments, the quaternary ammonium cationic counterion is selected from the group consisting of benzyltributylammonium bromide, benzyltributylammonium chloride, benzyltriethylammonium chloride, benzyltriethylammonium bromide, benzyltriethylammonium iodide, benzyltrimethylammonium iodide, benzyltrimethylammonium bromide, benzyltrimethylammonium chloride, and mixtures and combinations thereof (neat or in solution). In embodiments, the cationic counterion is selected from the group consisting of benzyltributylammonium, benzyltriethylammonium, benzyltrimethylammonium, and mixtures and combinations thereof.

In embodiments, the lignosulfonate compound contains a cationic counterion comprising a nitrogen-aryl cationic counterion. In other embodiments, the lignosulfonate compound contains a cationic counterion comprising a nitrogen-arylalkyl cationic counterion.

In specific embodiments, the quaternary ammonium cationic counterion herein can be esterquats of the formula

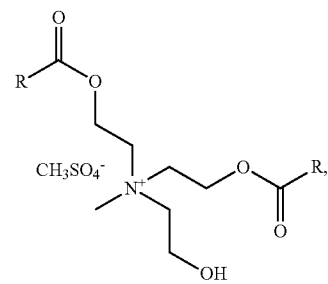

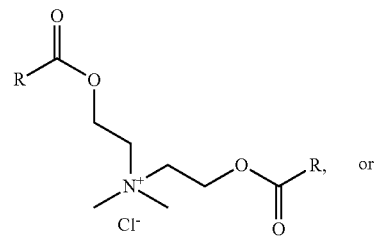 or

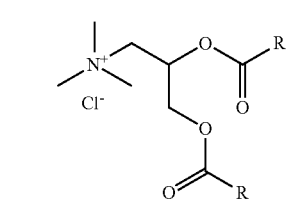

wherein R is n-heptyl, n-nonyl, n-undecyl, n-tridecyl, n-pentadecyl, n-heptadecyl, n-nonadecyl, n-heneicosyl, and mixtures thereof.

Examples of esterquats include, but are not limited to, esterquats such as those available from Kao Chemicals Inc., quaternary ammonium salts of: reacted fatty acids, C10-C20 and unsaturated C16-C18, with triethanolamine (CAS No. 91995-81-2), reacted tallow fatty acids with triethanolamine (CAS No. 93334-15-7), reacted fatty acids, C12-C20 with triethanolamine (CAS No. 91032-11-0), reacted 9-octadecenoic acid (Z) with triethanolamine (CAS No. 94095-35-9), reacted octadecenoic acid with triethanolamine (CAS No. 85408-12-4). Other examples of esterquats include dimethylbis[2-[(1-oxooctadecyl)oxy]ethyl]ammonium chloride (CAS No. 67846-68-8), Dimethylbis[2-[(1-oxohexadecyl)oxy]ethyl]ammonium chloride (97158-31-1), and (Z)-2-hydroxy-3-[(1-oxo-9-octadecenyl)oxy]propyltrimethylammonium chloride (CAS No. 19467-38-0).

In specific embodiments, the cationic counterion is selected from the group consisting of tetraoctyl ammonium, tetradodecyl ammonium, tetraoctadecyl ammonium, cetyltrimethylammonium, N,N-dimethyl dioctadecyl ammonium, N,N-dimethyl dioctyl ammonium, N,N-dimethyl dodecyl ammonium, 1-hexadecanaminium, N,N-dihexacecyl-N-methyl ammonium, and mixtures thereof.

A method for reducing or eliminating altogether drooling and staining of an ink jet print head faceplate by various pigmented solid inks comprises use of the modified lignosulfonate compounds herein. The lignosulfonic acid compound herein is modified to be insoluble in water and suitable for solid ink applications. In embodiments, the lignosulfonate compound or lignosulfonic acid salt compound includes a counter-ion including at least one long aliphatic tail. In certain embodiments, the lignosulfonic acid compound herein includes a counter-ion having a tail having eight or more carbon atoms.

Drooling of an ink is an undesirable phenomenon that is caused when an uncontrollable and unyielding quantity of ink continues to flow through a given print head's nozzles after nullification of an applied pressure during a purge cycle. Applied pressures that resulted in the drooling of the reference ink base were measured and ranged from 2.1 to 2.8 inches of water, as measured by a pressure gauge. These values were somewhat dependent on the history of testing done on various printheads, nevertheless, all of the reference ink bases drooled above the minimum desired applied pressure criterion of about 1.5 inches of water. In the examples, drool pressure was measured with a model number DPIS8 pressure transducer available from Omega Engineering, Inc. (Stamford, Conn.) and calibrated against a manometer. However, other types of pressure transducers may also be used to measure drool pressure.

The drool pressure threshold of a given test ink was determined by first applying the pressure at the range used for the ink base. If drooling was observed, the drooling pressure threshold of that test ink would be determined by applying graduated decreases in pressure. The delta drool pressure of a given test ink was also calculated by the difference of the measured drool pressure thresholds of the reference ink base and the test ink sample.

Δ(Drool Pressure)=Drool Pressure(sample)−Drool Pressure(reference)

It is desirable to have as small as possible a delta drool pressure of a given ink such that optimum jetting and print performance can be realized.

The gauge pressure is that measured pressure realized in the printer's Low Pressure Assist cycle above atmospheric pressure. Drool pressure of a sample ink is the gauge pressure realized that causes the ink to burst out of at least some of the nozzles in the printhead which can be accurately measured by a micropressure gauge. Drooling of inks in a printhead complicate the jetting process due to undesirable inter-nozzle color mixing as well as resulting in the undesirable depletion of ink from the ink loader. Drool pressure of a reference ink is that gauge pressure realized that causes the reference ink to burst out of at least some of the nozzles in the printhead which can be measured by a micropressure gauge. Typically this pressure value satisfies the requirements for successful jetting over the many purge and wipe cleaning cycles that occurs over the lifetime of the printer. Staining of the printhead is the undesirable fouling of the faceplate by an ink, or at least a portion of an ink, which can be qualitatively assessed through visual observation. For example, staining can be seen as ink smeared on the surface of the faceplate. Thus, a desirable observation is when little or no ink is observed on the faceplate. A printhead that has been very undesirably compromised by staining from an ink, or a portion of an ink, will likely be more prone to ink drooling at even lower applied pressures during the course of the printer's normal purge and wipe cleaning cycles. In the present embodiments, there is provided a phase change ink composition that has a drool pressure in a printer of at least 1.5 inches of water. In further embodiments, the composition has a drool pressure in of from about 1.5 inches of water to about 6.0 inches of water or of from about 2.8 inches of water to about 6.0 inches of water.

Pigment Ink is the ink composition including the carrier and colorant; and Ink Base is the ink carrier without the colorant.

Staining of a printhead faceplate occurs when the ink adheres to the faceplate and cannot be removed by typical printer purge-wipe cleaning cycles. Staining is a qualitative test that can be measured by visual observation. Phase change ink containing the modified lignosulfonate compounds herein exhibits little to no staining or fouling as measured by visual observation.

Most solid inks containing pigments drool and stain the faceplate from drool pressures at or approaching Delta Drool Pressure of about −2 inches of water compared to base ink. A solid pigment ink with improved drool performance is highly desirable.

One approach for addressing drool and staining of the faceplate by pigmented solid ink comprises the use of compounds containing acid groups in ink formulations. For example, inks prepared with commercially available synergists such as Solsperse® 5000 (a derivatized sulfonated copper phthalocyanine) and Solsperse® 22000 (a derivatized sulfonated Pigment Yellow 12 as disclosed in U.S. Patent Application Publication Number 2008/0308004, which is hereby incorporated by reference herein in its entirety) at nominal ink loadings below 1% by weight (synergist only) showed no drooling or staining behavior. However, when the synergist loading was increased at or above 2.5% by weight (synergist only) for the purposes of exploring the concept of the synergist itself being a colorant, the inks displayed strong gelling behavior and were not suitable as inkjet inks. It has been discovered that commercially available synergists cannot be used as colorants or as anti-drooling additives.

Lignosulfonates or sulfonated lignins are a water-soluble byproduct from the production of wood pulp using sulfite pulping. Most delignification in sulfite pulping involves acidic cleavage of ether bonds which connect many of the constituents of lignin. The electrophilic carbocations produced during ether cleavage react with bisulfate ions ($HSO_3^-$) to give lignin sulfonates.

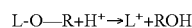

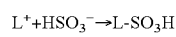

wherein R is a leaving group from lignin; and
wherein $L^+$ is lignin with positive charge.

Lignin can have different molecular weights. Lignin is a cross-linked racemic macromolecule with molecular masses in excess of 10,000 atomic mass units. It is relatively hydrophobic and aromatic in nature. The degree of polymerisation in nature is difficult to measure, since it is fragmented during extraction and the molecule consists of various types of substructures that appear to repeat in a haphazard manner. Different types of lignin have been described depending on the means of isolation. There are three monolignol monomers, methoxylated to various degrees: p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. Thioglycolysis is an analytical technique for lignin quantitation. Lignin structure can also be studied by computational simulation. See http://en.wikipedia.org/wiki/Lignin.

Lignosulfonic acid sodium salt is a compound that contains functional acid groups and is soluble in water. Lignosulfonates can be recovered from spent pulping liquids by treating same with excess metal hydroxide. The resultant lignosulfonates are typically used as dispersants in products like fodder, dyes and industrial cleaners. In water, the hydrophobic part of the molecule binds to the particle while hydrophilic part binds to the water and thus the particle is kept in solution. Since lignosulfonate metal salt is water soluble, it cannot be used in low polarity solid ink compositions.

In embodiments, a modified lignosulfonic acid compound having a long and/or bulky N-alky/aryl cationic counterion is provided. In specific embodiments, N-alkylated cationic counterions having alkyl chains of at least eight carbon atoms, and in embodiments having alkyl chains of greater than eight carbon atoms are provided. In certain embodiments, cationic counterions are selected from the group consisting of tetraoctylammonium, tetradodecylammonium, tetraoctadecylammonium, trimethylcetyl ammonium, N,N-dimethyl dioctadecyl ammonium, N,N-dimethyl dioctyl ammonium, N,N-dimethyl dodecyl ammonium, and mixtures thereof.

In other embodiments, quaternary ammonium compounds are provided for solubilizing lignosulfonate in solid ink. Quaternary ammonium compounds comprising alkyltrimethylammonium chlorides can be represented by the formula R—N(CH$_3$)$_3$Cl wherein R is a long chain alkyl group having at least 8 carbon atoms. A variety of compounds of this class are available varying as to the length and number of long chain alkyl groups attached to the nitrogen atom. Certain quaternary ammonium compounds are marketed by Akzo Nobel N.V. under the trade-name ARQUAD®.

In specific embodiments, a modified lignosulfonic acid including N,N-dimethyl dioctadecyl cationic counterion is provided having the formula

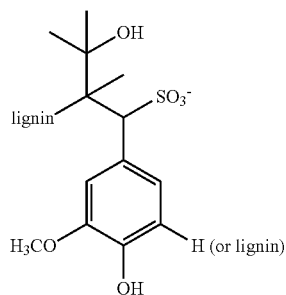

In other specific embodiments, modified lignosulfonic acid including a quaternary ammonium cationic counterion, in embodiments, Arquad® 316 available from Akzo Nobel, is provided having the formula

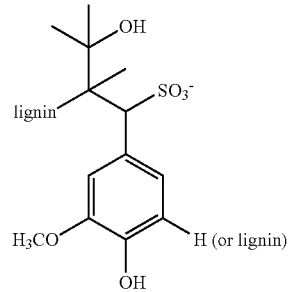

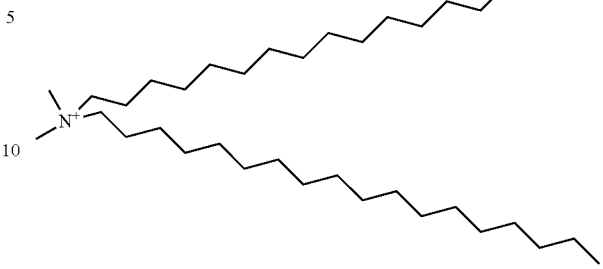

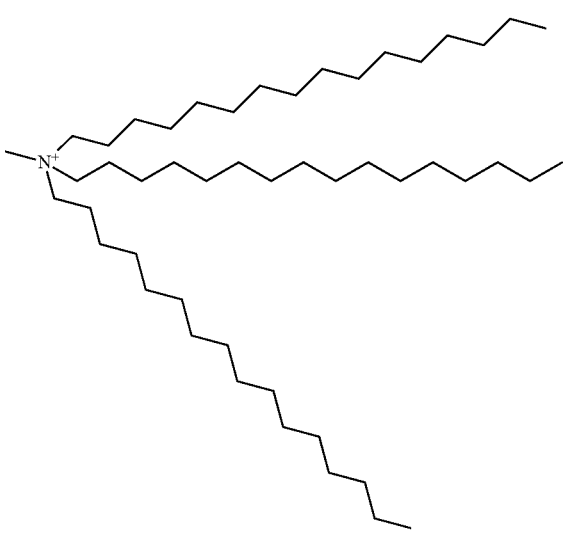

In embodiments, a schematic modification of lignosulfonate with Arquad® 316 is as follows:

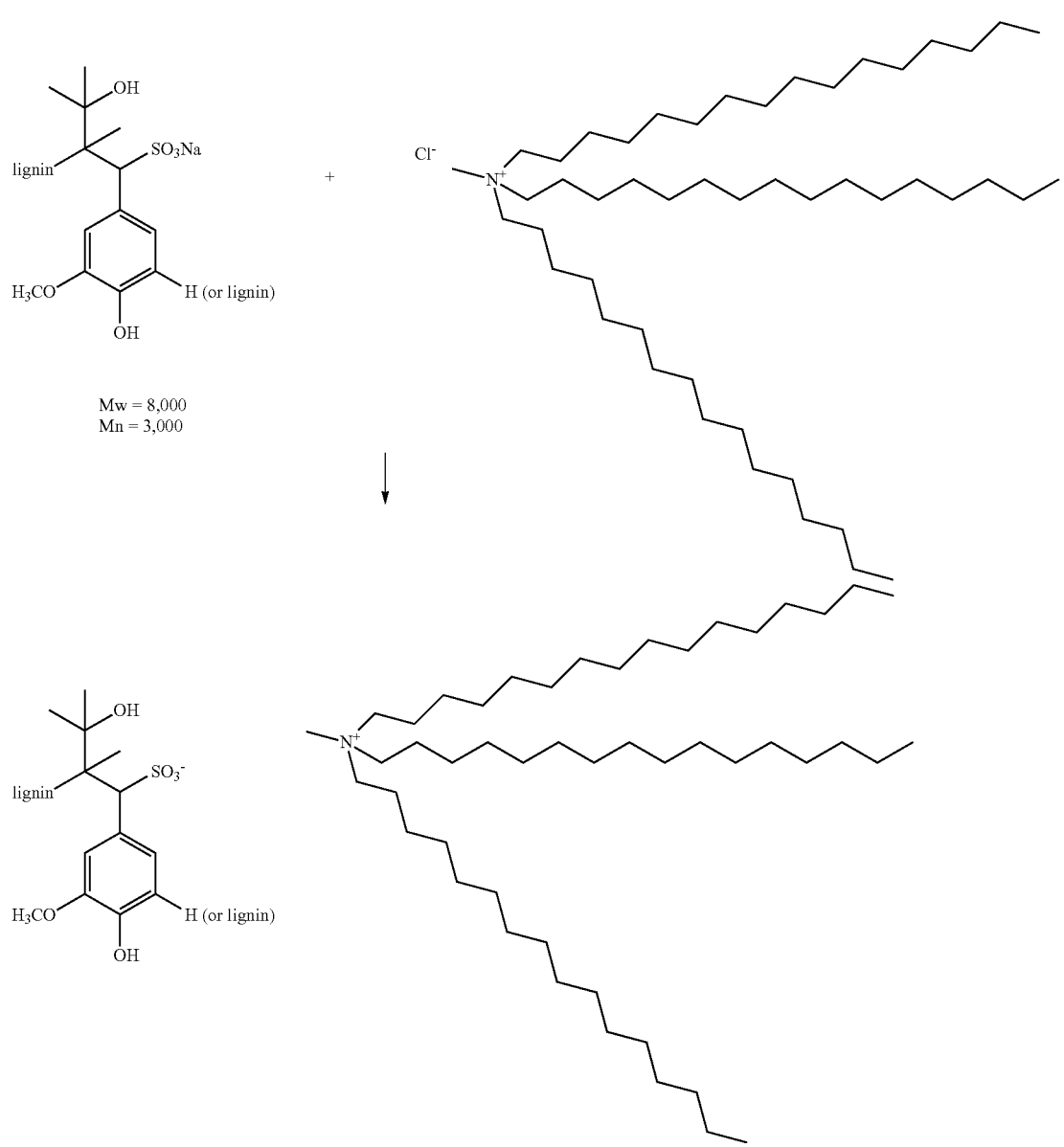

The modified lignsulfonate compound herein can be prepared by any suitable or desired method. In embodiments, a process for preparing a lignosulfonate compound for phase change ink comprises contacting a lignosulfonate metal salt with a compound to provide a nitrogen-alkyl cationic counterion, a nitrogen-aryl cationic counterion, a nitrogen-alkylaryl cationic counterion, or a nitrogen arylalkyl cationic counterion, wherein the cationic counterion contains at least eight carbon atoms, to produce a modified lignosulfonate compound. In embodiments, the process comprise dissolving the lignsosulfonate metal salt can be dissolved in water with heating; adding the compound to provide a nitrogen-alkyl cationic counterion, a nitrogen-aryl cationic counterion, a nitrogen-alkylaryl cationic counterion, or a nitrogen arylalkyl cationic counterion, wherein the cationic counterion contains at least eight carbon atoms; and optionally, isolating the modified lignosulfonate compound, such as by filtration.

The process may include additional process steps. The process can further comprise steps of cooling and isolating the product which steps can be performed according to the knowledge of a person having ordinary skill in the art. Various techniques for these processing steps are known in the chemical arts.

Lignosulfonate metal salts can be obtained commercially. For example, lignosulfonic acid sodium salt, lignosulfonic acid calcium salt, and lignosulfonic acid acetate sodium salt can be obtained from Sigma Aldrich.

Cationic counterion components for modifying the lignosulfonate metal salts can be obtained commercially. For example, certain quaternary ammonium compounds are under the trade-name ARQUAD® and are by Akzo Nobel N.V.

Heating of the mixture containing the lignosulfonate and the ammonium cationic counterion can be to any suitable or desired temperature, such as from about room temperature, or about 20° C. to about 80° C. Heating can be for any suitable or desired amount of time. In embodiments, heating comprises heating to a temperature of from about 20° C. to about 80° C. for a period of from about 30 minutes to about 2 hours.

The amount of cationic counterion component can be any suitable or desired amount. For example, the amount of quaternary ammonium salt used for the preparation of modified lignosulfonic acid herein can be determined as a function of the metal content present in the starting material. The ligno-sulfonate can be dissolved in water with heating and the quaternary ammonium salt can be added gradually with stirring. The resultant insoluble product can be isolated such as by filtration.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

The ink components below were combined as described in the examples below. The percentages in the ink formulation are based on weight. Several inks and ink bases containing various dispersants with or without modified lignosulfonic acid were evaluated for drool in a Xerox® print head.

Polyethylene wax herein is a polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety.

Triamide wax as prepared in Example 1 of U.S. Pat. No. 6,860,930, which is hereby incorporated by reference herein in its entirety.

KEMAMIDE® S-180, stearyl stearamide available from Chemtura Corporation.

KE-100, triglycerides of hydrogenated abietic acid, available from Arakawa Chemical Industries.

Urethane resin as prepared in Example 4 of U.S. Pat. No. 6,309,453, which is hereby incorporated by reference herein in its entirety.

Naugard® 445, aromatic amine antioxidant available from Chemtura Corporation.

Arquad® 316, tricetyl ammonium chloride, available from Akzo Nobel.

Lignosulfonic acid sodium salt and N,N-dimethyldioctadecyl bromide, available from Sigma-Aldrich Co. LLC.

Solsperse® 13240 and Solsperse® 11000 dispersants, available from The Lubrizol Corporation, used neat.

Dispersants described in U.S. Pat. No. 7,973,186, which is hereby incorporated by reference herein in its entirety.

Example 1

Standard ink formulation. In a 500 milliliter beaker were introduced 86.7 grams (54.2%) distilled polyethylene wax, 20.4 grams (12.75%) triamide wax as prepared in Example 1 of U.S. Pat. No. 6,860,930, 28.56 grams (17.85%) KEMAMIDE® S-180, 20.4 grams (12.75%) KE-100, 3.59 grams (2.24%) urethane resin as prepared in Example 1 of U.S. Pat. No. 6,309,453, 0.34 grams (0.21%) Naugard® 445. The solids were allowed to melt in an oven at 130° C. until all components were molten. The resultant ink base was filtered through a 5 μm stainless steel mesh.

Comparative Example 2

Ink base containing S11000® neat. In a 500 milliliter beaker were introduced 82.16 grams (51.38%) distilled polyethylene wax, 21.55 grams (13.47%) triamide wax as prepared in Example 1 of U.S. Pat. No. 6,860,930, 27.84 grams (17.4%) KEMAMIDE® S-180, 21.5 grams (13.47%) KE-100, 3.84 grams (2.4%) urethane resin as prepared in Example 4 of U.S. Pat. No. 6,309,453, 0.496 grams (0.31%) Naugard® 445 and 2.56 grams (1.6%) Solsperse® 11000. The mixture was allowed to melt in an oven at 130° C. until all components were molten. The resultant ink base was filtered through a 5 μm stainless steel mesh.

Comparative Example 3

Ink base containing S13240® neat. In a 500 milliliter beaker were introduced 84.94 grams (53.1%) distilled polyethylene wax, 20.0 grams (12.5%) triamide wax as prepared in Example 1 of U.S. Pat. No. 6,860,930, 28.0 grams (17.5%) KEMAMIDE® S-180, 20 grams (12.5%) KE-100, 3.52 grams (2.2%) urethane resin as prepared in Example 4 of U.S. Pat. No. 6,309,453, 0.336 grams (0.21%) Naugard® 445 and 3.2 grams (2%) Solsperse® 13240. The mixture was allowed to melt in an oven at 130° C. until all components were molten. The resultant ink base was filtered through a 5 μm stainless steel mesh.

Example 4

Ink base containing Solsperse® 13240 neat and modified lignosulfonic acid. In a 500 milliliter beaker were introduced 79.98 grams (49.99%) distilled polyethylene wax, 21.0 grams (13.1%) triamide wax as prepared in Example 1 of U.S. Pat. No. 6,860,930, 27.2 grams (17.0%) KEMAMIDE® S-180, 21 grams (13.1%) KE-100, 4.0 grams (2.5%) urethane resin as prepared in Example 4 of U.S. Pat. No. 6,309,453, 0.496 grams (0.31%) Naugard® 445, and 3.2 grams (2%) Solsperse® 13240. The mixture was allowed to melt in an oven at 130° C. until all components were molten. When the mixture looked homogenous, 3.2 grams (2.0%) of modified lignosulfonic acid of the formula

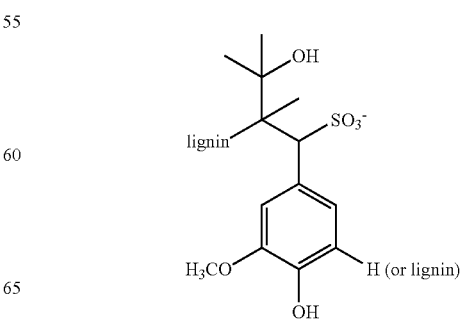

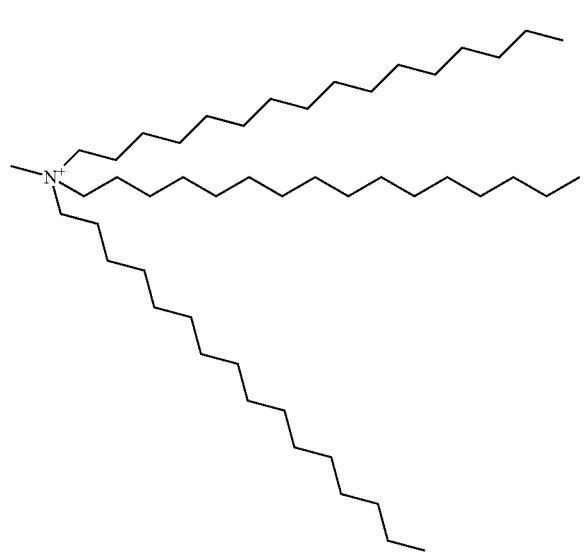

were added with stirring. The resultant mixture was filtered through a 26 µm stainless steel mesh followed by a filtration through 5 µm stainless steel mesh to remove unmodified lignin.

Comparative Example 5

In a 500 milliliter beaker were introduced 84.78 grams (53.0%) distilled polyethylene wax, 20 grams (12.5%) triamide wax as prepared in Example 1 of U.S. Pat. No. 6,860,930, 28 grams (17.5%) KEMAMIDE® S-180, 20 grams (12.5%) KE-100, 3.6 g (2.25%) urethane resin as prepared in Example 4 of U.S. Pat. No. 6,309,453, 0.336 grams (0.21%) Naugard® 445, and 3.28 grams (2.05%) of a dispersant compound as prepared in Example 1 of U.S. Pat. No. 7,973,186. The mixture was allowed to melt in an oven at 130° C. until all components were molten. The resultant mixture was filtered through a 5 µm stainless steel mesh.

Example 6

In a 500 milliliter beaker were introduced 80.27 grams (50.17%) distilled polyethylene wax, 20.48 grams (12.8%) triamide wax as prepared in Example 1 of U.S. Pat. No. 6,860,930, 28.27 grams (17.67%) KEMAMIDE® S-180, 20.48 grams (12.8%) KE-100, 3.6 grams (2.25%) urethane resin as prepared in Example 4 of U.S. Pat. No. 6,309,453, 0.336 grams (0.21%) Naugard® 445, and 3.28 grams (2.05%) a dispersant compound as prepared in Example 1 of U.S. Pat. No. 7,973,186. The mixture was allowed to melt in an oven at 130° C. until all components were molten. When the mixture looked homogenous, 3.28 grams (2.05%) of modified lignosulfonic acid of the formula

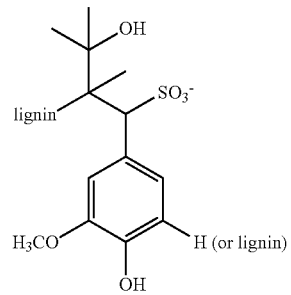

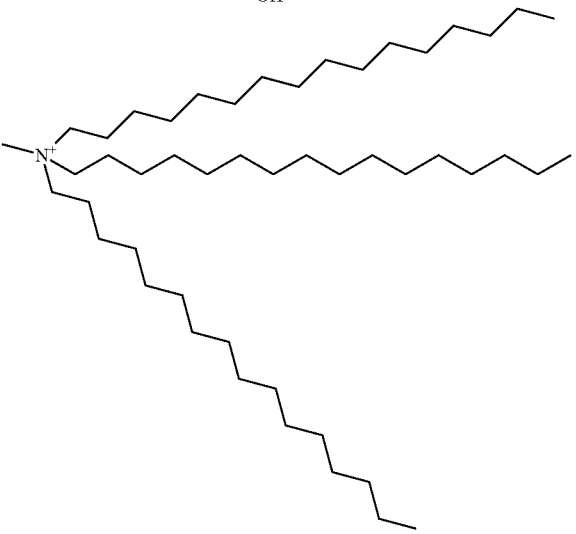

were added with stirring. The resultant mixture was filtered through a 26 µm stainless steel mesh followed by a filtration through 5 µm stainless steel mesh to remove unmodified lignin.

Comparative Example 7

In a 500 milliliter beaker were introduced 84.86 grams (53.04%) distilled polyethylene wax, 20.0 grams (12.5%) triamide wax as prepared in Example 1 of U.S. Pat. No. 6,860,930, 28.0 grams (17.5%) KEMAMIDE® S-180, 20 grams (12.5%) KE-100, 3.52 grams (2.2%) urethane resin as prepared in Example 4 of U.S. Pat. No. 6,309,453, 0.336 grams (0.21%) Naugard® 445, and 3.2 grams (2%) a dispersant compound as prepared in Example 2 of U.S. Pat. No. 7,973,186. The mixture was allowed to melt in an oven at 130° C. until all components were molten. The resultant ink base was filtered through a 5 µm stainless steel mesh.

Example 8

In a 500 milliliter beaker were introduced 80.27 grams (50.17%) distilled polyethylene wax, 20.48 grams (12.8%) triamide wax as prepared in Example 1 of U.S. Pat. No. 6,860,930, 28.27 grams (17.67%) KEMAMIDE® S-180, 20.48 grams (12.8%) KE-100, 3.6 grams (2.25%) urethane resin as prepared in Example 4 of U.S. Pat. No. 6,309,453, 0.336 grams (0.21%) Naugard® 445, and 3.28 grams (2.05%) of a dispersant compound as prepared in Example 2 of U.S. Pat. No. 7,973,186. The mixture was allowed to melt in an oven at 130° C. until all components were molten. When the mixture looked homogenous, 3.28 grams (2.05%) of modified lignosulfonic acid of the formula

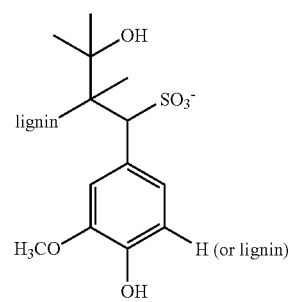

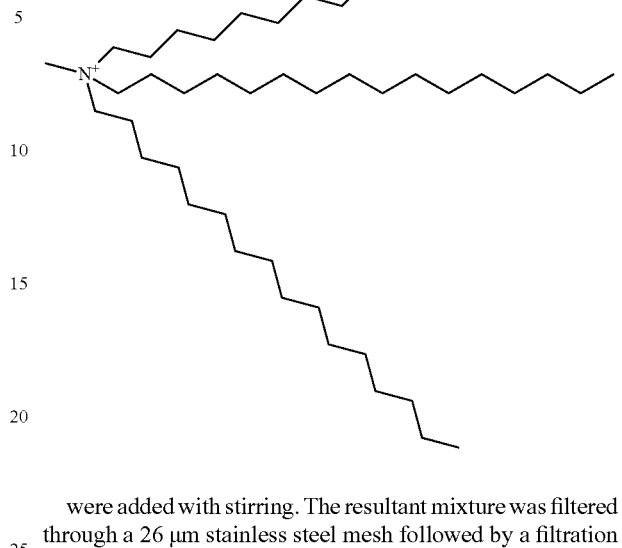

were added with stirring. The resultant mixture was filtered through a 26 μm stainless steel mesh followed by a filtration through 5 μm stainless steel mesh to remove unmodified lignin.

Example 9

In a 500 milliliter beaker were introduced 79.68 grams (49.8%) distilled polyethylene wax, 19.46 grams (12.16%) triamide wax as prepared in Example 1 of U.S. Pat. No. 6,860,930, 27.65 grams (17.28%) KEMAMIDE® S-180, 19.0 grams (12.16%) KE-100, 3.6 grams (2.25%) urethane resin as prepared in Example 4 of U.S. Pat. No. 6,309,453, 0.336 grams (0.21%) Naugard® 445, and 3.28 grams (2.05%) a dispersant compound as prepared in Example 2 of U.S. Pat. No. 7,973,186. The mixture was allowed to melt in an oven at 130° C. until all components were molten. When the mixture looked homogenous, 6.54 grams (4.09%) of modified lignosulfonic acid of the formula

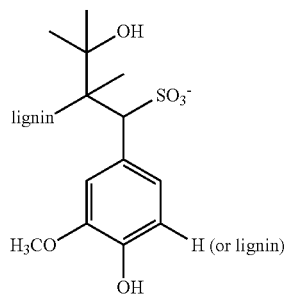

were added with stirring. The resultant mixture was filtered through a 26 μm stainless steel mesh followed by a filtration through 5 μm stainless steel mesh to remove unmodified lignin.

Comparative Example 10

The following materials were weighed in a 600 milliliter beaker such that the accompanying weight percentages also include the pigment, dispersant and pigment synergist that were added in subsequent mixing step: 81.25 grams (50.78%) of a distilled polyethylene wax (a polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety, 19.95 grams (12.47%) triamide wax prepared as described in Example 1 of U.S. Pat. No. 6,860,930, 27.79 grams (17.37%) of KEMAMIDE® S-180, 19.95 grams (12.47%) KE-100 resin, 3.76 grams (2.3%) of a urethane resin as prepared in Example 4 of U.S. Pat. No. 6,309,453, the disclosure of which is totally incorporated herein by reference, 0.5 grams (0.31%) Naugard® 445, and 2.56 grams (1.8%) of Solsperse® 11000. The materials were melted in an oven at 120° C., mixed well, and then transferred to a Szevari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 3.2 grams (2%) of a C.I. Pigment Blue 15:3 pigment commercially available from Clariant Corporation, 0.8 grams (0.5%) of a cyan pigment synergist commercially available from Sun Chemical Corporation. The pigmented ink was allowed to attrite at 250 revolutions per minute for 18 hours upon which the final attrited mixture was isolated from the stainless steel balls and filtered with a 5 micron stainless steel stainless steel mesh using a KST-47 filtration apparatus, commercially available from Advantec Corporation.

Example 11

Cyan ink containing lignosulfonic acid was prepared as in Comparative Example 10, except that 3.6 grams (2.25% of the final ink) lignosulfonic acid derivative of the formula

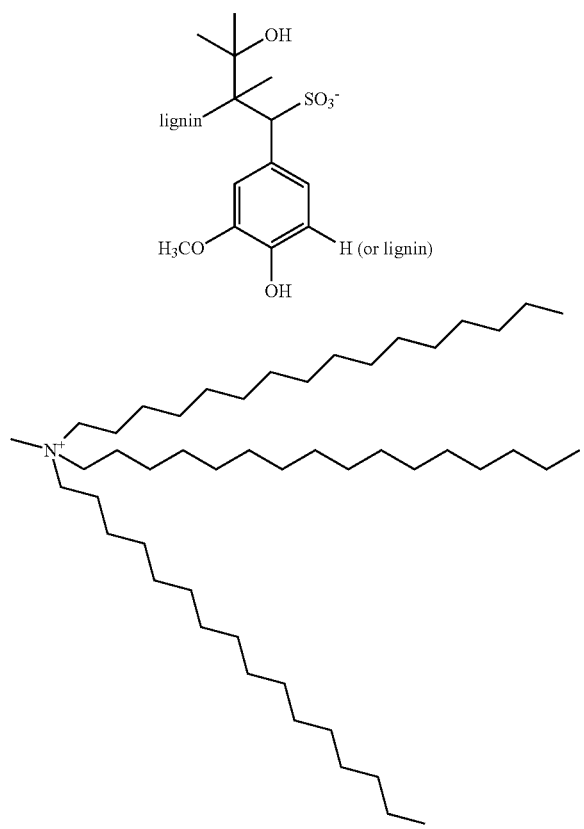

were added and attrited and filtered in the same manner as in Example 10.

FIG. 1 is a graph illustrating infrared spectra of a sodium lignosulfonate 10 and a modified lignosulfonate 12 in accordance with the present disclosure. The modified lignosulfonate compound 12 modified with Arquad® 316 contains an intense peak at 2922.69 cm$^{-1}$ and 2852.39 cm$^{-1}$ wavenumbers due to sp$^3$ stretching of C—H from substitution of sodium with Arquad® 316. The non-modified lignosulfonate 10 has a comparatively weaker peak at 2936.71 cm$^{-1}$ wavenumbers.

Drool Testing and Results.

Drooling of an ink can be described as an uncontrollable and unyielding quantity of ink that continues to flow through a given print head's nozzles after nullification of an applied pressure during a purge cycle. Staining, also an undesirable phenomenon, can be described as all or a portion of the latent ink that remains on the print head faceplate even after several printer purge/wipe cycles. To assess resistance to drooling, the ink was tested in a Xerox® print head.

Applied pressures that resulted in the drooling of the reference ink base were measured and ranged from 2.1 to 2.8 inches of water, as measured by a pressure gauge. These values were somewhat dependent on the history of testing done on various printheads, nevertheless, all of the reference ink bases drooled above the minimum desired applied pressure criterion of about 1.5 inches of water. In the examples, drool pressure was measured with a model number DPIS8 pressure transducer available from Omega Engineering, Inc. (Stamford, Conn.) and calibrated against a manometer. However, other types of pressure transducers may also be used to measure drool pressure.

The drool pressure threshold of a given test ink was determined by first applying the pressure at the range used for the ink base. If drooling was observed, the drooling pressure threshold of that test ink would be determined by applying graduated decreases in pressure.

The delta drool pressure of a given test ink was also calculated by the difference of the measured drool pressure thresholds of the reference ink base and the test ink sample.

Quantification of ink drool was determined as follows:

Δ(Drool Pressure)=Drool Pressure(sample)−Drool Pressure(reference)

Thus, a test ink having negative differential inches water, relative to ink base, is drooling at a lower applied pressure. Drool and face plate fouling test results for exemplary ink bases and inks are presented in the Table below:

TABLE 1

| Example | Type | Dispersant (2% of ink) | Weight % Modified Lignosulfonic Acid | Drool Pressure (gauge), inches of water | Drool as Δ pressure (inches of water) | Visual Observation of Fouling |
|---|---|---|---|---|---|---|
| 1 | Ink base | None | 0 | 2.20 | 0 | No |
| Comparative 2 | Ink base | Solsperse® 11000 | 0 | 0.71 | −1.5 | Yes |
| Comparative 3 | Ink base | Solsperse® 13240 | 0 | 0.23 | −1.97 | Yes |
| 4 | Ink base | Solsperse® 13240 | 2 | 1.53 | −0.67 | No |
| Comparative 5 | Ink base | [1]Dispersant Compound 1 | 0 | 1.56 | −0.64 | Yes |
| 6 | Ink base | [1]Dispersant Compound 1 | 2 | 2.20 | 0 | No |

TABLE 1-continued

| Example | Type | Dispersant (2% of ink) | Weight % Modified Lignosulfonic Acid | Drool Pressure (gauge), inches of water | Drool as Δ pressure (inches of water) | Visual Observation of Fouling |
|---|---|---|---|---|---|---|
| Comparative 7 | Ink base | [2]Dispersant Compound 2 | 0 | 1.01 | −1.2 | Yes |
| 8 | Ink base | [2]Dispersant Compound 2 | 2 | 1.45 | −0.75 | Slight |
| 9 | Ink base | [2]Dispersant Compound 2 | 4 | 2.20 | 0 | No |
| Comparative 10 | Cyan ink | Solsperse® 11000 | 0 | 1.05 | −1.2 | Yes |
| 11 | Cyan ink | Solsperse® 11000 | 1 | 1.71 | −0.49 | No |

[1]dispersant compound as prepared in Example 1 of U.S. Pat. 7,973,186
[2]dispersant compound as prepared in Example 2 of U.S. Pat. 7,973,186

Δ drool pressure values of about −0.8 to 0 inches of water are especially preferred as these values indicate a normal range of print head values for optimum performance of inks over purge/wipe cycles. As can be seen from the Table, examples of the present disclosure incorporating the modified lignosulfonic acid compound provided drool values of Δ drool pressure between −0.8 to 0 inches of water which was a significant improvement over those comparative examples that did not incorporate the modified lignosulfonic acid compound. For instance, Example 3, which contains Solsperse® 13240, resulted in a catastrophic failure such that auto-drooling and severe fouling of the print head was evident. The addition of just 2% by weight modified lignosulfonic acid compound of the present disclosure (to form the ink of Example 4) resulted in a much-reduced differential drool pressure where no fouling of the print head was observed. Further, the addition of just 1% modified lignosulfonic acid compound of the present disclosure to a cyan ink containing Solsperse® 11000 significantly reduced the differential drool pressure such that it was within an acceptable range.

Thus, improved modified lignosulfonic acid compounds are described that are compatible for use in solid ink formulations and that provided improved drooling and staining characteristics of the solid ink. Further, green or bio-renewable modified lignosulfonic acid additives are described for pigmented solid ink that provide improved face plate drooling and staining characteristics.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:
1. A lignosulfonate compound for phase change ink of the formula:

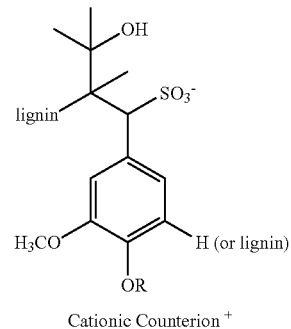

wherein R is hydrogen or

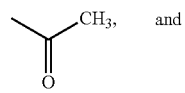

wherein the cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

2. The lignosulfonate compound of claim 1, wherein the cationic counterion includes an alkyl group containing at least eight carbon atoms.

3. The lignosulfonate compound of claim 1, wherein the cationic counterion comprises two alkyl chains.

4. The lignosulfonate compound of claim 1, wherein the cationic counterion comprises three alkyl chains.

5. The lignosulfonate compound of claim 1, wherein the cationic counterion is selected from the group consisting of tetraoctylammonium, tetradodecylammonium, tetraoctadecylammonium, N,N-dimethyl dioctadecyl, N,N-dimethyl dioctyl ammonium, N,N-dimethyl dodecyl ammonium, N,N,N-trimethyl-1-docosanaminium, behenyl trimethylammonium, N-octadecyltrimethylammonium, mixtures and combinations thereof, and salts thereof.

6. The lignosulfonate compound of claim 1, wherein the cationic counterion is selected from the group consisting of cocoalkyltrimethylammonium, didecydimethylammonium, coco(fractionated) dimethylbenzylammonium, hexadecyltrimethylammonium, stearyltrimethylammonium, behenyltrimethylammonium, mixtures and combinations thereof, and salts thereof.

7. The lignosulfonate compound of claim 1, wherein the cationic counterion is a compound of the formula

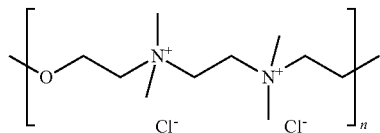

wherein n is at least 1.

8. The lignosulfonate compound of claim 1, wherein the cationic counterion is selected from the group consisting of benzyltributylammonium, benzyltriethylammonium, benzyltriethylammonium, benzyltrimethylammonium, and mixtures and combinations thereof.

9. The lignosulfonate compound of claim 1, wherein the cationic counterion is a compound of the formula

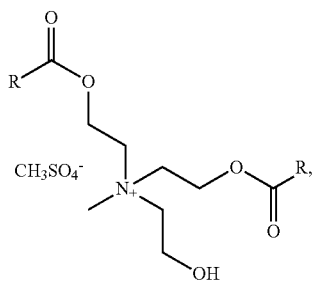

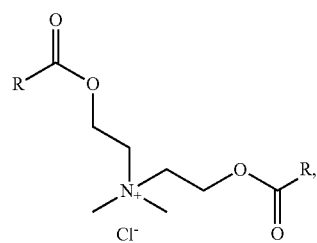

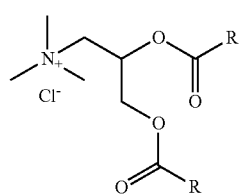

wherein R is n-heptyl, n-nonyl, n-undecyl, n-tridecyl, n-pentadecyl, n-heptadecyl, n-nonadecyl, n-heneicosyl, and mixtures thereof.

10. The lignosulfonate compound of claim 1, of the formula:

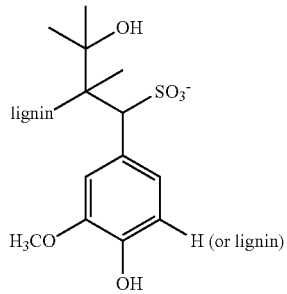

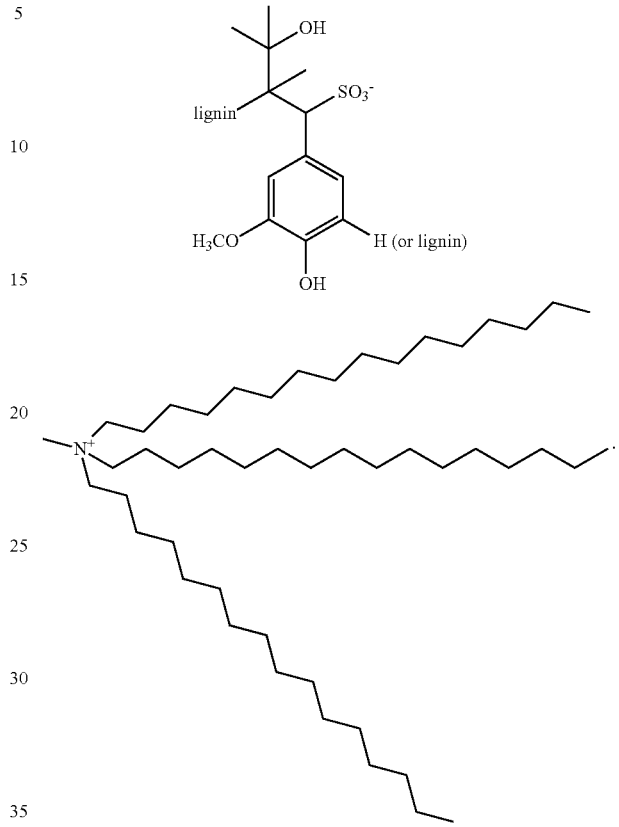

11. The lignosulfonate compound of claim 1, of the formula:

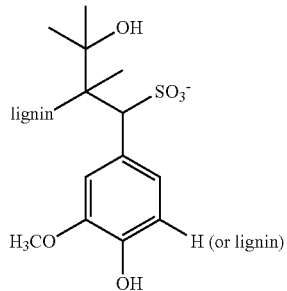

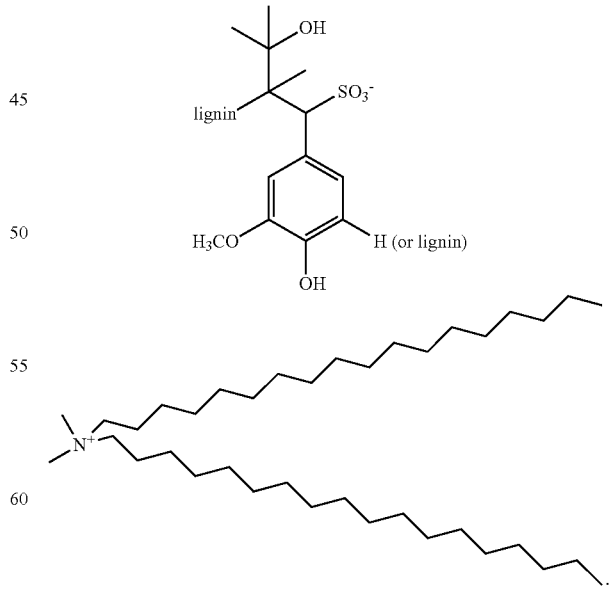

12. A process for preparing a lignosulfonate compound for phase change ink of claim 1 comprising:

contacting a lignosulfonate metal salt with a nitrogen-alkyl cationic counterion compound, a nitrogen-aryl cationic counterion compound, a nitrogen-alkylaryl cationic counterion compound, or a nitrogen arylalkyl cationic counterion compound, wherein the cationic counterion contains at least eight carbon atoms, to produce a modified lignosulfonate compound.

13. The process of claim 12, comprising:
dissolving the lignsosulfonate metal salt in water with heating;
adding the nitrogen-alkyl cationic counterion compound, nitrogen-aryl cationic counterion compound, nitrogen-alkylaryl cationic counterion compound, or nitrogen arylalkyl cationic counterion compound, wherein the cationic counterion contains at least eight carbon atoms;
optionally, isolating the modified lignosulfonate compound.

14. The process of claim 13, wherein heating comprises heating to a temperature of from about 20° C. to about 80° C.

15. The process of claim 13, wherein heating comprises heating to a temperature of from about 20° C. to about 80° C. for a period of from about 30 minutes to about 2 hours.

16. The process of claim 12, wherein the nitrogen-alkyl cationic counterion compound is selected from the group consisting of tetraoctylammonium, tetradodecylammonium, tetraoctadecylammonium, N,N-dimethyl dioctadecyl ammonium, N,N-dimethyl dioctyl ammonium, N,N-dimethyl dodecyl ammonium, N,N,N-trimethyl-1-docosanaminium, behenyl trimethylammonium, N-octadecyltrimethylammonium, mixtures and combinations thereof, and salts thereof.

17. The process of claim 12, wherein the modified lignosulfonate compound is of the formula:

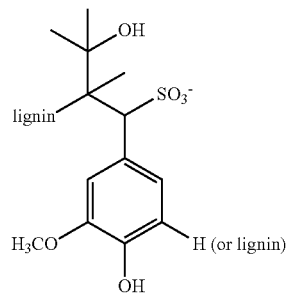

18. The process of claim 12, wherein the modified lignosulfonate compound is of the formula:

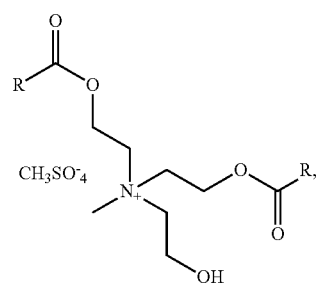

19. The process of claim 12, wherein the cationic counterion is a compound of the formula

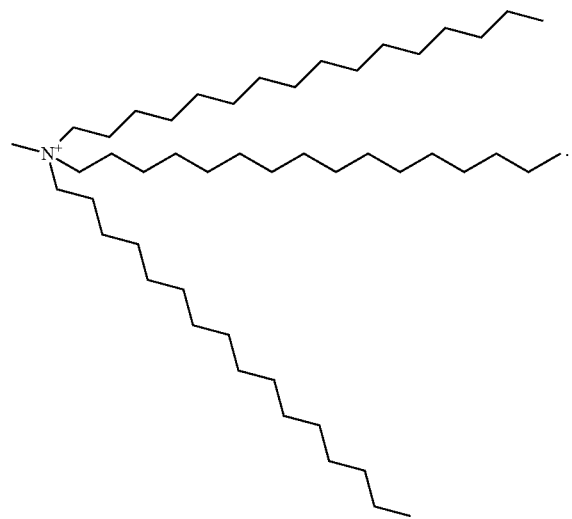

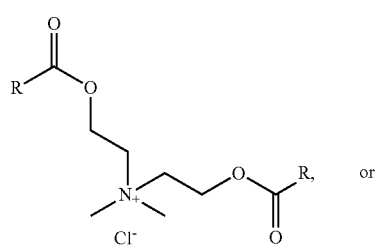

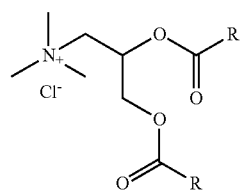
wherein R is n-heptyl, n-nonyl, n-undecyl, n-tridecyl, n-pentadecyl, n-heptadecyl, n-nonadecyl, n-heneicosyl, and mixtures thereof.
* * * * *